United States Patent [19]

Beacom

[11] 4,262,701
[45] Apr. 21, 1981

[54] CONCRETE PIPE LIFT HOLE PLUG

[76] Inventor: Roger R. Beacom, 942 W. Douglas Ct., Venice, Fla. 33595

[21] Appl. No.: 65,936

[22] Filed: Aug. 13, 1979

[51] Int. Cl.³ .............................................. F16L 55/16
[52] U.S. Cl. ......................................... 138/89; 138/92; 138/94; 138/98; 152/370; 220/213; 220/307; 220/352; 220/DIG. 13; 220/DIG. 19; 411/456
[58] Field of Search ....................... 138/89, 94, 92, 98; 220/213, 245, 307, 375, DIG. 13, DIG. 19, 352, 361; 217/98, 110; 85/16, 19, 21, 30, DIG. 2; 152/370

[56] References Cited

U.S. PATENT DOCUMENTS

| 733,014 | 7/1903 | Cox | 220/DIG. 19 |
|---|---|---|---|
| 821,041 | 5/1906 | Kinney | 152/370 |
| 1,287,042 | 12/1918 | Kennedy | 220/213 X |
| 1,800,173 | 4/1931 | Anderson | 220/307 |
| 2,420,353 | 5/1947 | Burrows | 220/DIG. 19 |
| 3,477,334 | 11/1969 | Stone et al. | 85/21 X |
| 3,532,372 | 10/1970 | Stroud | 220/307 X |

FOREIGN PATENT DOCUMENTS 2334869  8/1977  France .

Primary Examiner—James E. Bryant, III
Attorney, Agent, or Firm—Hauke and Patalidis

[57] ABSTRACT

A plug for obturating the lift hole of poured concrete drain pipes or conduits. The plug, preferably made of a plastic molding, comprises a generally thin head in the form of a plate and a shank projecting from the lower surface of the plate. The shank has at least two substantially thin fins extending radially from a common centerline, each having a lateral edge engageable with the rim of the hole obturated by the plug. Preferably, the shank is cruciform and is provided with three or more fins.

9 Claims, 15 Drawing Figures

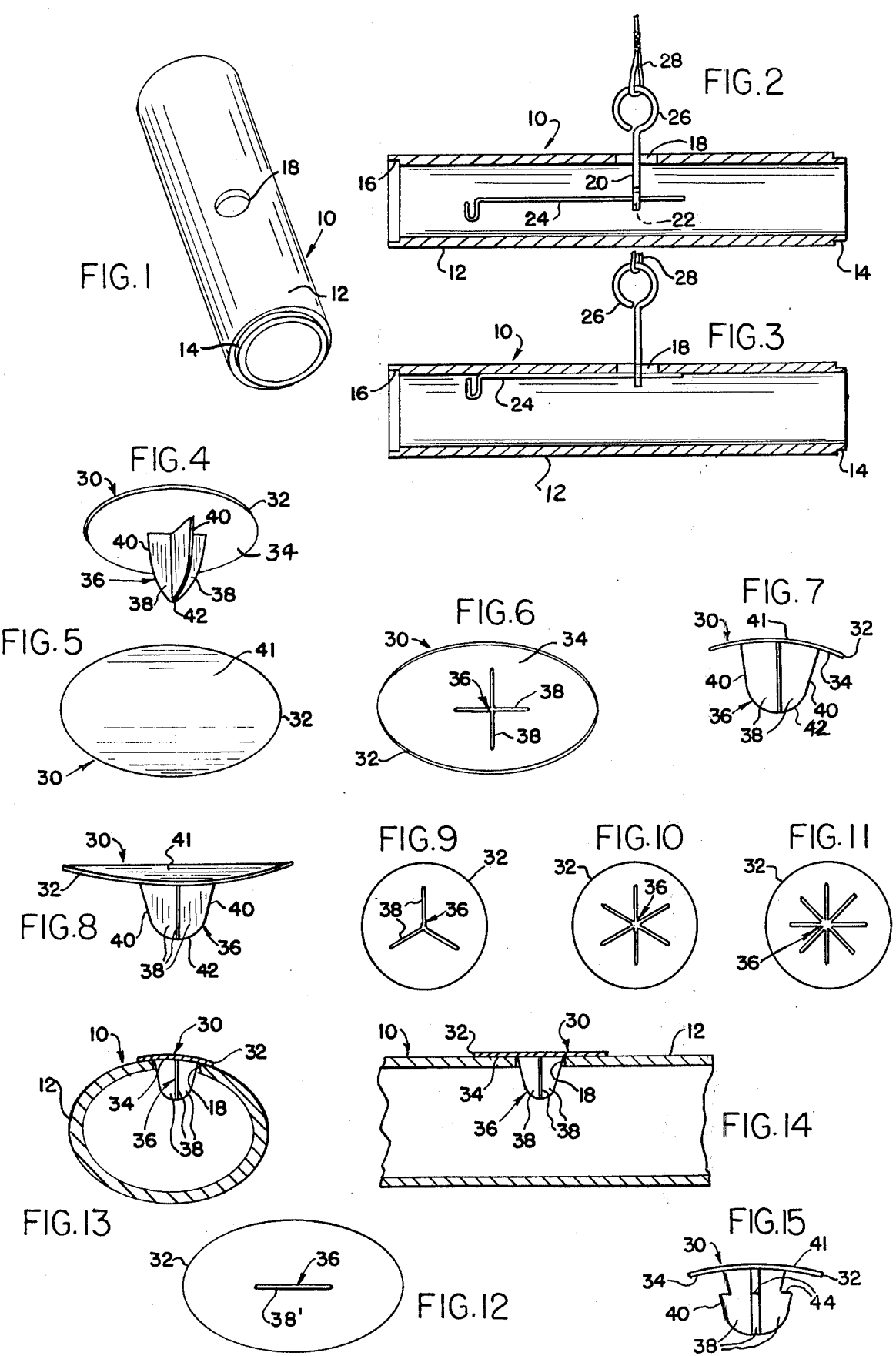

CONCRETE PIPE LIFT HOLE PLUG

BACKGROUND OF THE INVENTION

The present invention relates to plugs for closing openings in conduits and more particularly to plugs for obturating lift holes or apertures through the wall of concrete drain pipes and the like.

Poured cement or concrete conduits, such as drain pipes, which provide a passageway for a liquid fluid such as water which is normally not under pressure, and large conduits for the passage of utility cables, telephone cables or the like are sometimes provided with a through-wall opening, or "lift-hole", disposed laterally substantially aligned with the center of gravity of the conduit. The lift hole greatly facilitates the installation of the conduit in a trench, for example, by means of an appropriate lifting arrangement passed through the lift hole and attached to the end of a crane cable or sling. By means of such an arrangement, the conduit is conveniently loaded on flat bed trucks, semi-trailers, or railroad cars, unloaded at a work site and positioned in a trench or excavation, several lengths of conduit being placed end to end such as to form a continuous conduit for drain water or the like, or for utility and telephone cables.

Prior to filling the trench with earth the lift holes are covered with a brick, a piece of concrete, a sheet of metal, or any other convenient means, and a shovelful of concrete is poured over the lift hole covering. After the concrete has set, the trench is filled, and the lift hole covering prevents earth from penetrating within the conduit through the lift hole.

SUMMARY OF THE INVENTION

The present invention provides a simple and low cost plug for obturating the lift holes of poured concrete or cement conduits and pipes installed in a trench or excavation, prior to filling the trench or excavation with earth. The invention accomplishes its objects and purposes by providing a plug having a head in the form of a relatively thin plate preferably made of plastic and provided with a shank projecting from one side of the head, the shank being made of a plurality of regularly extending thin fin-like members, preferably molded integral with or attached to the plug head and insertable into the lift hole in which they remain frictionally and compressibly held.

Because the plug head overlaps the lift hole, it is not necessary to pour over the head of the plug of the invention fresh concrete and wait until the concrete has set prior to filling the trench or excavation. Because the plug of the invention is made of relatively thin members which can be easily molded integrally or separately and then assembled by heat welding or cementing, the complete plug structure is very light, requires only a small amount of raw materials, and is easily manufactured in mass production at low cost.

The many advantages and objects of the present invention will become apparent to those skilled in the art when the following description of some of the best modes contemplated for practicing the invention is read in conjunction with the accompanying drawing wherein like reference numerals refer to like or equivalent parts, and in which:

BRIEF DESCRIPTION OF THE DRAWINGS

FIG. 1 is a perspective view of an example of a poured concrete drainage pipe provided with a lift hole;

FIGS. 2 and 3 are longitudinal sections through the drainage pipe of FIG. 1 illustrating an arrangement for lifting the pipe;

FIG. 4 is a perspective view of an example of lift hole plug according to the present invention;

FIG. 5 is a top plan view thereof;

FIG. 6 is a bottom plan view thereof;

FIG. 7 is an end elevational view thereof;

FIG. 8 is a side elevation view thereof;

FIGS. 9–12 are views similar to FIG. 6, but showing alternate modifications thereof;

FIGS. 13 and 14 are respectively a transverse section and a partial longitudinal section through a poured concrete drainage pipe shown with its lift hole plugged with the plug of FIGS. 4–8; and FIG. 15 is a view similar to FIG. 7, but showing a modification thereof.

DETAILED DESCRIPTION OF THE PREFERRED EMBODIMENTS

Conventional poured cement or concrete drainage pipes such as the concrete pipe 10 shown at FIGS. 1–3 are made in an appropriate length, such as 8 feet, for example, whch is a convenient length for transporting the pipes over the highways by loading them side by side transversely on a flat bed truck or semi-trailer. Such concrete pipes are in the form of a tubular conduit 12 generally provided at one end with a stepped reduced outer diameter short portion 14 fitting within the enlarged inner diameter portion 16 disposed at the other end, such as to provide mutual interlocking of consecutive pipes 10 disposed end to end in a trench or excavation. The tubular conduit 12 may be circularly cylindrical but, preferably and as illustrated, it is made with a slightly flattened shape, or an oval cross-section.

Substantially at mid-distance between the ends of the pipe 10 there is an aperture or lift hole 18 provided through the side wall of the conduit 12, substantially aligned with its center of gravity. As illustrated at FIGS. 2–3, the lift hole 18 affords passage to the end of a lift rod 20 provided on one end with a slit 22 through which is manually disposed a retainer rod 24, the other end of the lift rod 20 being bent over in the form of a loop 26 to which is attached an end of a cable or sling 28, the other end of which is attached to the shackle of a crane, not shown, or to any other appropriate lifting implement. FIG. 2 illustrates the relative position of the diverse elements forming the lifting arrangement for the pipe 10 during engagement of the retainer rod 24 through the lift rod slit 22 prior to lifting the pipe, and during disengagement of the retainer rod 24 after placing the pipe 10 on a supporting surface. FIG. 3 illustrates the relative position of the elements while the pipe 10 is lifted from a truck or trailer bed, for example, for placing into a trench. It will be readily appreciated that such an arrangement for lifting the pipes leaves the end of the pipes 10 entirely free, thus permitting to align each pipe in a trench during installation of the pipes, with the reduced outer diameter end portion 14 of a pipe 10 free to be introduced into the enlarged inner diameter portion 16 of an adjoining pipe.

Prior to filling the trench with earth, the lift hole 18 is obturated conventionally by any available convenient means, such as placing thereover a brick, a piece of concrete or a sheet of convenient material, and throwing over the hole covering a shovelful of fresh cement or concrete.

The present invention takes the forms of a plug 30, FIGS. 4–8, preferably made of plastic materials such as for example acrylonitrile-butadiene-styrene thermoplastic polymers (ABS resins), polyvinyl chloride resins, or mixtures thereof, and the like. Preferably, thermoplastic resins are used but thermosetting resins may also be used for making the plug 30. As the plug 30 of the invention needs not meet any special requirement, other than being able to plug the lift hole of a drainage pipe or the like, the choice of material is infinite and dictated only by convenience, availability and low cost of the materials.

The plug 30 comprises essentially a head portion 32 made of substantially thin sheet material, provided on a surface 34, and substantially at the center of such surface, with a shank 36 made of a plurality of substantially rectangular fins 38. The axis of the shank 36 extends substantially orthogonal to the lower surface 34 of the head 32, and the shank 36 is downwardly tapered as a result of the outer edge 40 of each fin 38 tapering downwardly to an arcuate lower edge 42. By being so made of radially extending fins 38, the shank 36 has a substantially cruciform shape, and the example of structure of FIGS. 4–8 is formed of four such fins 36 disposed regularly substantially at 90° relative to each other.

The plug head 32 may be flat or, preferably and as shown, it has a laterally curved surface, such that when the plug 30 is inserted in the lift hole 18 of the pipe 10, FIGS. 12–13, the lower surface 34 of the plug head 32 closely follows the curved peripheral contour of the tubular conduit 12 and thus avoiding the presence of a space between the plug head lower surface 34 and the curved peripheral surface of the tubular conduit 12 where the head 32 overlaps the lift hole 18. Any amount of overlap of the head 32 is suitable, and the shape of the plug head 32 may be any convenient shape, such as the oval shape illustrated at FIGS. 4–8 and 12, or the circular shape illustrated at FIGS. 9–11, or any other shape. At the cost of a slight additional quantity of raw material, the oval shape of the plug head 30 of FIGS. 5–8 presents the double advantage of offering considerable longitudinal overlap of the plugged lift hole 18 and of presenting a substantial outer area surface 41 for a trademark, for instructions, or for advertisement.

Although the plug 30 of FIGS. 4–8 has a shank 36 comprising four fin members 38 which may be molded either integral with the head 36, or as a separate integral molding cemented to the bottom surface 34 of the head 34, or, alternatively, as individual fins 38 cemented together at their straight adjoining edges and in turn cemented to the head bottom surface 34, alternatively and as illustrated at FIGS. 9–11, the shank 36 may consist of three fin members 38 preferably disposed regularly at 120° from each other, or it may consist of any number of fins 38, such as five, six (FIG. 10), seven, eight (FIG. 11) or more. It may even be found convenient to form the shank 36 of a single flat fin 38', FIG. 12, such fin 38' being disposed at the center of the head 32 and consisting of a thin member shaped substantially as a pair of fins 38 disposed in a single plane, substantially according to the structure of FIGS. 4–8 with a pair of opposed fins 38 omitted.

When placed in position such as to obturate the lift hole 18 of a concrete drainage pipe 10, FIGS. 13–14, the plug 30 is frictionally and resiliently held until the trench in which the pipes 10 are disposed are filled, in view of the slight resiliency of the material forming the plug. As the plug is not subject to great pressure from the drainage water flowing through the pipe, only the weight of the fill dirt is sufficient to maintain it in position, without requiring placing on the top of the pipe, over the plug, any additional fresh cement or concrete, unless so desired. Even if the shank 36 has an overall diameter dimension smaller than the diameter of the lift hole 18, the plug 30 is held loosely in position and prevented from being laterally displaced, and thus uncovering the lift hole, during filling of the trench or excavation. Alternatively, each fin 30 may be provided at its edge 40 with a step or barb 44, FIG. 15, formed at a distance from the lower surface 34 of the head 32 slightly larger than the pipe wall thickness. The steps or barb 44 act as a retainer means locking the plug 30 in position in the pipe lift hole.

It will be appreciated that although particularly well designed for plugging lift holes of drainage poured concrete pipe, the plug of the invention may be easily adapted to plugging apertures, such as mounting apertures in flat sheet metal parts or the like.

Having thus described the present invention by way of examples of structural embodiment thereof, modification whereof will be apparent to those skilled in the art, what is claimed as novel is as follows:

1. A plug comprising a head having a top surface and a bottom surface and a shank projecting from said bottom surface of said head, said head being substantially a thin plate and said shank having a centerline substantially orthogonal to said head bottom surface and extending from the center of said head bottom surface, said shank being formed of at least a pair of substantially thin plate flat fin-like members projecting substantially orthogonal to said head bottom surface, said fin-like members being interconnected along said centerline and each having an outer edge tapering from said head bottom surface to the end of said shank and each being disposed in a plane extending radially from said common centerline.

2. The plug of claim 1 wherein said head bottom surface is curved to conform to a curved surface provided with an aperture obturated by said plug.

3. The plug of claim 1 wherein said shank is cruciform and is formed of at least three of said fin-like members disposed regularly substantially at equal mutual angular orientation.

4. The plug of claim 3 wherein said head bottom surface is curved to conform to a curved surface provided with an aperture obturated by said plug.

5. The plug of claim 1 wherein said head and said shank are made of plastic.

6. The plug of claim 5 wherein said head and said shank are molded integrally.

7. The plug of claim 5 wherein said head and said shank are made separately and attached together.

8. The plug of claim 4 wherein said head is substantially oval, said curved bottom surface extends transversely and said shank is formed of four fin-like members disposed substantially at right angle to each other.

9. The plug of claim 1 wherein each of said fin-like members has a lateral step formed at said outer edge.

* * * * *